United States Patent
Redmond

(10) Patent No.: US 10,958,761 B1
(45) Date of Patent: Mar. 23, 2021

(54) METHOD AND APPARATUS TO PROVIDE INTEGRITY MONITORING OF A SAFETY CRITICAL APPLICATION ON A NON-SAFETY-CRITICAL PLATFORM

(71) Applicant: AVIATION COMMUNICATION & SURVEILLANCE SYSTEMS, LLC, Phoenix, AZ (US)

(72) Inventor: James P. Redmond, Glendale, AZ (US)

(73) Assignee: AVIATION COMMUNICATION & SURVEILLANCE SYSTEMS, LLC, Phoenix, AZ (US)

(*) Notice: Subject to any disclaimer, the term of this patent is extended or adjusted under 35 U.S.C. 154(b) by 0 days.

(21) Appl. No.: 16/416,690

(22) Filed: May 20, 2019

Related U.S. Application Data

(62) Division of application No. 12/050,135, filed on Mar. 17, 2008, now Pat. No. 10,298,718.

(Continued)

(51) Int. Cl.
    *G01F 3/00* (2006.01)
    *H04L 29/08* (2006.01)
    (Continued)

(52) U.S. Cl.
    CPC ...... *H04L 67/34* (2013.01); *B64D 2045/0075* (2013.01); *G01C 23/00* (2013.01);
    (Continued)

(58) Field of Classification Search
    USPC .............................................. 701/22; 726/26
    See application file for complete search history.

(56) References Cited

U.S. PATENT DOCUMENTS

| | | | | | |
|---|---|---|---|---|---|
| 4,994,974 | A | * | 2/1991 | Cummings | ............ G01C 21/22 701/461 |
| 7,149,612 | B2 | * | 12/2006 | Stefani | ................... G01D 9/005 701/31.9 |

(Continued)

FOREIGN PATENT DOCUMENTS

| EP | 2129998 A2 | * | 12/2009 | ............. G06F 3/147 |
|---|---|---|---|---|
| EP | 2665013 A1 | * | 5/2019 | ............. G01C 21/00 |
| EP | 3477619 A1 | * | 5/2019 | ........... G08G 5/0013 |

OTHER PUBLICATIONS

Exploiting dual-polarization technique in weather radar for civil aircrafts to mitigate risk in adverse conditions; F. Cuccoli et al., 2015 1st URSI Atlantic Radio Science Conference (URSI AT-RASC); IEEE Conference Paper (Year: 2015).*

(Continued)

*Primary Examiner* — Cuong H Nguyen
(74) *Attorney, Agent, or Firm* — Dickinson Wright PLLC

(57) ABSTRACT

A system is delineated comprising a processor for performing operations for the system; memory for storing an operating system and one or more applications, the one or more applications including at least one application requiring certification by a certifying authority for use on the system and at least one application not requiring certification by the certifying authority for use on the system; and an application for use in conjunction with a provided processor external to and not part of the system to determine if the at least one application requiring certification is being interfered with or not executing properly. In certain instances, this system may comprise a class 1 electronic flight bag (EFB) or a class 2 EFB. Related methods are also described.

12 Claims, 1 Drawing Sheet

Related U.S. Application Data

(60) Provisional application No. 60/918,627, filed on Mar. 15, 2007.

(51) Int. Cl.
*G06F 3/147* (2006.01)
*G01C 23/00* (2006.01)
*H04B 7/185* (2006.01)
*B64D 45/00* (2006.01)
*G06F 8/60* (2018.01)

(52) U.S. Cl.
CPC ............... *G06F 3/147* (2013.01); *G06F 8/60* (2013.01); *H04B 7/18506* (2013.01)

(56) References Cited

U.S. PATENT DOCUMENTS

| | | | | |
|---|---|---|---|---|
| 7,421,319 | B2 * | 9/2008 | Stefani | G08G 5/0034 244/75.1 |
| 7,827,400 | B2 * | 11/2010 | Allen | H04L 63/0869 713/156 |
| 8,164,485 | B2 * | 4/2012 | Prinzel, III | G01C 23/00 340/945 |
| 8,290,642 | B2 * | 10/2012 | Hanson | G01C 23/00 701/14 |
| 8,412,401 | B2 * | 4/2013 | Bertosa | G06F 17/00 701/29.1 |
| 8,751,067 | B2 * | 6/2014 | Pham | G06F 3/147 701/3 |
| 8,768,534 | B2 * | 7/2014 | Lentz | G01C 23/00 701/1 |
| 9,509,394 | B1 * | 11/2016 | Mitchell | H04W 12/02 |
| 10,298,718 | B1 * | 5/2019 | Redmond | H04L 67/34 |
| 10,532,823 | B1 * | 1/2020 | Barber | G06T 11/60 |
| 2005/0149238 | A1 * | 7/2005 | Stefani | G08G 5/0021 701/33.4 |
| 2006/0149434 | A1 * | 7/2006 | Bertosa | G07C 5/006 701/31.4 |
| 2006/0282597 | A1 * | 12/2006 | Plogmann | G09G 5/363 710/303 |
| 2007/0016344 | A1 * | 1/2007 | Stefani | H04L 65/1069 701/3 |
| 2007/0055416 | A1 * | 3/2007 | Allen | G08G 5/0013 701/3 |
| 2008/0208399 | A1 * | 8/2008 | Pham | G01C 23/00 701/4 |
| 2010/0262318 | A1 * | 10/2010 | Ariens | G08G 5/003 701/3 |
| 2012/0320895 | A1 * | 12/2012 | Srinivasan | G01C 23/00 370/338 |
| 2013/0013935 | A1 * | 1/2013 | Haukom | G06F 1/266 713/300 |
| 2013/0124018 | A1 * | 5/2013 | Lentz | G07C 5/008 701/3 |
| 2020/0082731 | A1 * | 3/2020 | Choi | G05D 1/0088 |

OTHER PUBLICATIONS

Hydrometeor classification for X-band dual polarization radar onboard civil aircrafts; N. Roberto;A. Adirosi;L. Baldini;L. Facheris;F. Cuccoli;A. Lupidi;A. Garzelli; 2015 IEEE International Geoscience and Remote Sensing Symposium (IGARSS); IEEE Conference Paper (Year: 2015).*

Technical approach to FF-ICE planning and global harmnization through IIH&V; Thien Ngo;Alessandro Zuniga; 2018 Integrated Communications, Navigation, Surveillance Conference (ICNS); IEEE Conference Paper (Year: 2018).*

* cited by examiner

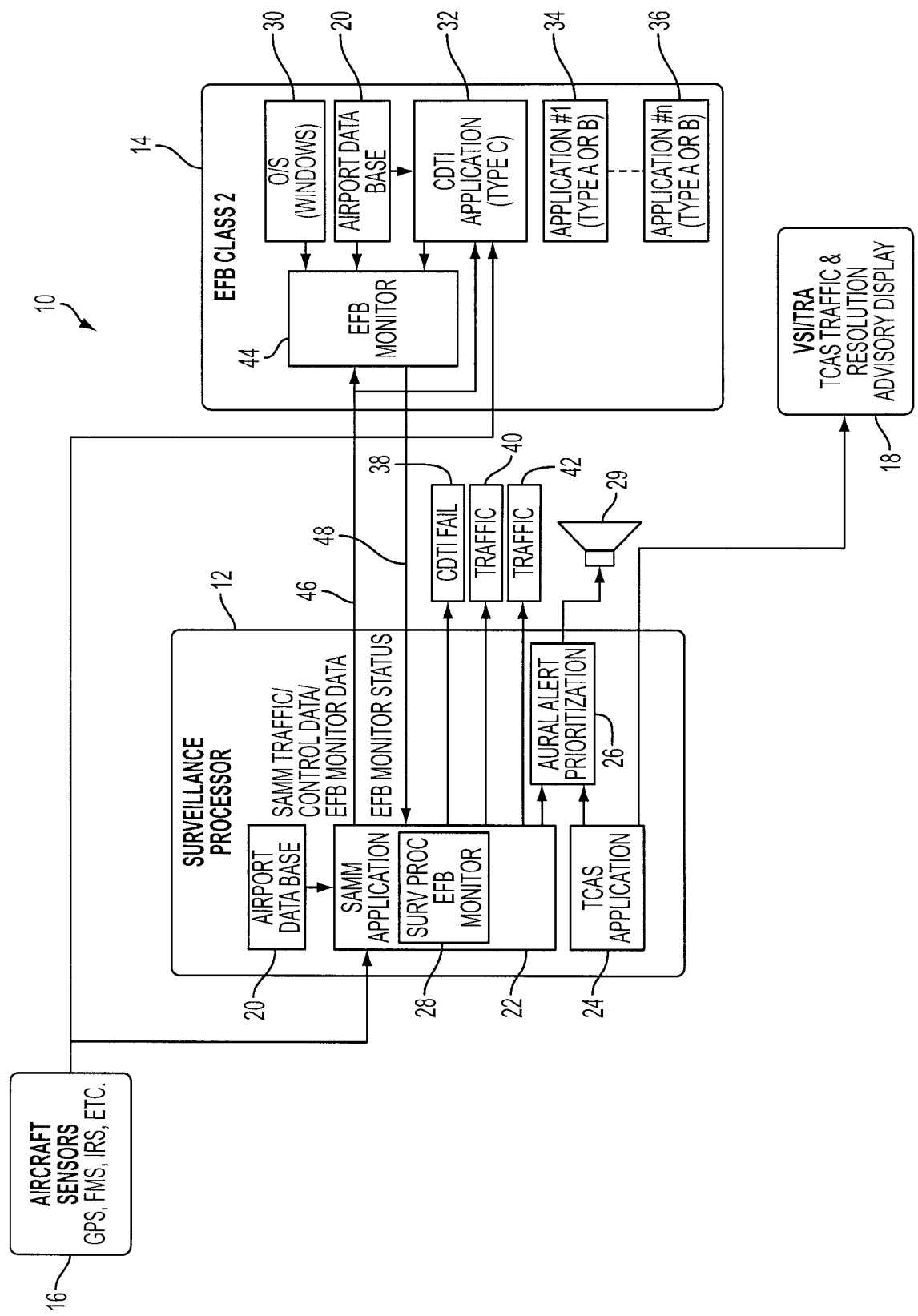

METHOD AND APPARATUS TO PROVIDE INTEGRITY MONITORING OF A SAFETY CRITICAL APPLICATION ON A NON-SAFETY-CRITICAL PLATFORM

CROSS REFERENCE TO RELATED APPLICATIONS

This application is a Divisional of U.S. patent application Ser. No. 12/050,135, filed Mar. 17, 2008 (Now U.S. Pat. No. 10,298,718), which is related to, claims priority from and hereby incorporates by reference U.S. Appl. No. 60/918,627, filed on Mar. 15, 2007 in the name of James Peter Redmond and entitled "METHOD AND APPARATUS TO PROVIDE INTEGRITY MONITORING OF A SAFETY CRITICAL APPLICATION ON A NON-SAFETY CRITICAL PLATFORM," the disclosures of which are hereby fully incorporated by reference for all purposes.

BACKGROUND OF THE INVENTION

Field of the Invention

The present invention relates to systems and methods for ensuring system reliability and safety, and more particularly, to systems and methods for providing integrity monitoring of a safety critical application on a non-safety-critical platform.

Description of the Related Art

An Electronic Flight Bag (EFB) is an electronic display system intended primarily for cockpit/flightdeck or cabin use. An EFB can display a variety of aviation data or perform basic calculations (e.g., performance data, fuel calculations, etc.). In the past, some of these functions were traditionally accomplished using paper references or were based on data provided to the flightcrew by an airline's "flight dispatch" function. The scope of the EFB system functionality may also include various other hosted databases and applications. EFB displays may use various technologies, formats, and forms of communication. EFBs are sometimes referred to as auxiliary performance computers (APC) or laptop auxiliary performance computers (LAPC).

The EFB gets its name from the traditional pilot's flight bag, which is typically a heavy bag (up to 40 pounds or more with documents) that pilots carry to the cockpit. The EFB is a digital format replacement for such documents that the pilot may typically or otherwise carry on board. A typical EFB weighs approximately 1-5 pounds, which is about the same as a laptop computer, and therefore, a fraction of the weight and volume of the paper publications typically carried in a pilot's flight bag.

There are numerous benefits from using an EFB, but the specific benefits may vary depending on the size of the operation, the type of applications used, the existing content management and distribution system and the type of applications deployed. Some common benefits may include: weight savings by replacing the traditional flight bag, reduced medical claims from handling traditional flight bags, reduced cost, and increased efficiency by reducing or eliminating paper processes. Use of an EFB may also increase safety and reduce pilot workload.

In addition to EFBs for civilian use, there are militarized variants, with secure data storage, night vision goggle compatible lighting, environmental hardening, and military specific applications and data.

The Federal Aviation Administration (FAA) provides an advisory circular (AC), AC 120-76A, entitled "Guidelines for the Certification, Airworthiness, and Operational Approval of Electronic Flight Bag Computing Devices," which is incorporated herein by reference. AC 120-76A is a joint Flight Standards Service (AFS) and Aircraft Certification Service (AIR) AC, which provides an acceptable method of compliance for the certification, airworthiness, and the operational approval of both portable and installed EFB aircraft computing devices. AC 120-76A does not constitute a regulation, but it sets forth an acceptable means, but not the only means, for operators conducting flight operations under Title 14 of the Code of Federal Regulations (14 CFR) part 91, 121, 125, 129, or 135, to obtain both certification and approval for the operational use of EFBs.

Currently, there are 3 classes of EFBs defined for aviation use:

Class 1—Generally, class 1 EFBs comprise commercial-off-the-shelf (COTS) computers, such as a laptop, which are not attached or mounted to the aircraft. No Aircraft Certification Service approval is required (i.e., no AIR approval is required as in a technical standard order (TSO), a supplemental type certificate (STC) or a type certificate (TC)), however Flight Standards Service (AFS) approval is required.

Class 2—A class 2 EFB may include class 1 EFB functionality. Additionally, a class 2 EFB may be attached to the aircraft during normal flight operations, and it may be connected to aircraft power and aircraft data interfaces or busses. AIR approval is required for the mounting and interface of a class 2 EFB, but not approval of the EFB device itself, however, AFS approval is required for the class 2 EFB.

Class 3—A class 3 EFB comprises installed equipment on an aircraft and requires AIR approval of the EFB and the installation of the EFB. A class 3 EFB must be developed to meet software design assurance guidelines outlined on RTCA DO-178B (entitled "Software Considerations in Airborne Systems and Equipment Certification"), along with environmental requirements as defined in RTCA DO-160 (entitled "Environmental Conditions and Test Procedures for Airborne Equipment"). A class 3 EFB may contain a partitioned design that runs non-certified applications.

There are 3 types of EFB applications defined by AC120-76A, which are categorized as type A, B and C. Type A and B applications may be hosted on all classes of EFBs (class 1, 2 and 3), and these applications do not require AIR approval. Type C applications, however, require a TSO or an STC for approval of the application, must be developed to meet RTCA DO-178B software design assurance guidelines, and may be hosted on class 3 EFBs. Some type C applications may be hosted on a class 1 EFB or a class 2 EFB, provided the following conditions are met:

The non-certified type A or B applications do not do not interfere with the type C application, without being detected.

The type C certified application has no greater than a minor failure safety affect on the aircraft.

SUMMARY OF THE INVENTION

In accordance with an embodiment of the present invention, an electronic flight bag (EFB) is disclosed comprising a processor for performing operations for the EFB; memory for storing an operating system and one or more applications, the one or more applications including at least one application requiring certification by a certifying authority for use on the EFB and at least one application not requiring certification by the certifying authority for use on the EFB; and an EFB monitoring application for use in conjunction with a provided processor external to and not part of the EFB to determine if the at least one application requiring certification is being interfered with or not executing properly.

In accordance with another embodiment of the present invention, an avionics system is disclosed comprising a processor for performing operations for the avionics system; memory for storing one or more applications, the one or more applications including at least one of a TCAS application and an application utilizing ADS-B; and a first application stored in the memory and for use in conjunction with a second application stored on a provided EFB to determine whether at least one application stored on the provided EFB and requiring certification by a certifying authority is being interfered with or not executing properly.

In accordance with another embodiment of the present invention, a system is disclosed comprising a processor for performing operations for the system; memory for storing an operating system and one or more applications, the one or more applications including at least one application requiring certification by a certifying authority for use on the system and at least one application not requiring certification by the certifying authority for use on the system; and an application for use in conjunction with a provided processor external to and not part of the system to determine if the at least one application requiring certification is being interfered with or not executing properly.

In accordance with another embodiment of the present invention, a method is disclosed comprising providing a processor for performing operations for a system; providing memory for storing an operating system and one or more applications, the one or more applications including at least one application requiring certification by a certifying authority for use on the system and at least one application not requiring certification by the certifying authority for use on the system; and providing an application for use in conjunction with a provided processor external to and not part of the system to determine if the at least one application requiring certification is being interfered with or not executing properly.

It is to be understood that both the foregoing general description and the following detailed description are exemplary and explanatory only and are not restrictive of the invention, as claimed.

The accompanying drawing, which is incorporated in and constitutes a part of this specification, illustrates several embodiments of the invention and together with the description, serves to explain the principles of the invention.

BRIEF DESCRIPTION OF THE DRAWINGS

FIG. 1 is a simplified block diagram of a system for detecting if one or more certified applications running on a non-certified platform are operating without interference from the platform or non-certified applications on the platform, in accordance with systems and methods consistent with the present invention.

DESCRIPTION OF THE EMBODIMENTS

Reference will now be made in detail to the present exemplary embodiments of the invention, examples of which are illustrated in the accompanying drawing.

Embodiments of the present invention provide the ability to host one or more type C applications on a class 1 EFB or a class 2 EFB. The cost of an installed class 3 EFB is roughly $150,000 to $200,000. The cost to install a class 2 EFB is typically one-fourth of the cost of installing a class 3 EFB. As there is typically no installation cost for a class 1 EFB, the cost for a class 1 EFB is simply the cost of the EFB itself, typically far less than the total cost for a class 2 EFB. Thus, the ability to host one or more type C applications on either a class 1 EFB or a class 2 EFB (instead of a class 3 EFB) is desirable.

Aviation Communication & Surveillance Systems (ACSS) is creating a software application for use in avionics systems know as the SAFEROUTE application. One of the functions provided by the SAFEROUTE application is known as the surface area movement management (SAMM) application. The SAMM application provides an alerting function which reduces the probability of runway incursion incidents occurring. Some implementations of the SAMM application use a cockpit display of traffic information (CDTI) display to show in the cockpit aircraft on the runway surface or approaching the runway surface. A CDTI function is a type C application which requires a TSO or STC approval. Thus, another embodiment of the present invention provides the ability to host a type C application, such as a CTDI function, on a class 1 EFB or a class 2 EFB.

More generally, additional embodiments of the present invention may provide any type-C-application (whether now known or later developed) of the SAFEROUTE application on a class 1 EFB or a class 2 EFB. And, even more generally, embodiments of the present invention may provide any type-C-application of the SAFEROUTE application (or any other application) on a class 1 EFB, a class 2 EFB or any other system besides a class 1 EFB or a class 2 EFB where a certified application is hosted on a non-certified platform.

Embodiments of the present invention provide methods for detecting whether one or more certified applications, such as type C application (e.g., a CTDI application), which are running on a non-certified platform, such as a class 1 EFB or a class 2 EFB, are operating without interference from the platform or non-certified applications on the platform. The embodiments of the present invention address the issue of detection, namely, detecting if one or more certified applications running on a non-certified platform are operating without interference from the platform or non-certified applications on the platform.

Referring to FIG. 1, a simplified block diagram is shown of a system for detecting if one or more certified applications running on a non-certified platform are operating without interference from the platform or non-certified applications on the platform. The certifying authority for an application or a platform may comprise any governmental entity or any private entity authorized to provide certifying authority. Moreover, the certifying authority need not be the same entity for certification of a given application or a given platform (i.e., there may different certifying authorities for applications and platforms, and even within the set of all applications or all platforms, there may be different certifying authorities).

In the example of FIG. 1, a simplified a block diagram is shown of an avionics system 10 consistent with embodiments of the present invention. System 10 may include a processor 12, an EFB 14, one or more aircraft sensors 16 and a display 18. System 10 includes a portion of the ACSS SAFEROUTE application for implementing the SAMM function on EFB 14, which in this exemplary embodiment comprises a class 2 EFB. This is merely one exemplary embodiment of the present invention. Those skilled in the art understand that items which are not pertinent to understanding the present invention, such as TCAS antennas, control panels, transponders, and other interfacing systems are omitted from FIG. 1 for clarity.

Processor or surveillance processor 12 (hereafter "surveillance processor 12") may include an airport database 20, the SAMM application 22, a TCAS application 24 and an aural alert prioritization function 26. Any conventional memory or storage system may be employed for the desired storage, and the memory or storage system may be part of the surveillance processor 12 or not. In one embodiment of the present invention, the surveillance processor 12 may host the TCAS application 24, as TCAS-II functionality per TSO-C119b and DO-185A, each of which are incorporated herein by reference. The surveillance processor 12 may also host the ADS-B 1090 MHz receive function per TSO-C166a and DO-260A (each of which are incorporated herein by reference), either as part of the SAMM application 22, separate from the SAMM application 22 or as a combination thereof. The TCAS application 24 provides TCAS traffic data to display 18, such as a vertical speed indicator/traffic resolution advisory (VSI/TRA) display or other TCAS traffic display. The SAMM application 22 provides surface traffic data to the CDTI application 32 for display via the EFB 14. The airport database 20 may either reside as part of the surveillance processor 12 or be separate but accessible to the surveillance processor 12.

In this exemplary embodiment, the TCAS and SAMM data are transferred on separate data busses, however, the same data bus may have integrated data for both the TCAS application 24 and the SAMM application 22. The TCAS application 24 and the SAMM application 22 provide aural alert signals, which go through an aural alert prioritization function 26 and emit a desired sound on speaker 29 according to the prioritization logic. The SAMM application 22 also provides visual indicators through discrete outputs or an ARINC 429 data bus, which may indicate a failure of the CDTI display (CDTI FAIL 38), a SAMM caution (Traffic 40), and a SAMM warning (TRAFFIC 42). The SAMM application 22 also uses the airport database 20 to provide alerts based on proximity to active runways or taxiways. The SAMM application 22 utilizes aircraft sensors 16, such as GPS, FMS, IRS or any other desired sensor to provide accurate position data for own ship.

The EFB 14, which in this exemplary embodiment comprises a class 2 EFB, may include a processor and memory or any other storage system to meet the storage needs of the EFB 14. The memory or storage system may reside within the EFB 14, outside of the EFB 14, or a combination thereof. The EFB 14 typically contains a non-certified operating system 30, such as WINDOWS, along with one or more type A or type B applications 34 and 36, which are uncertified. The CDTI application 32 also resides on the EFB 14 and comprises a type C application requiring a TSO or STC. The CDTI application 32 may also operate in conjunction with the airport database 20 for rendering an image of the airport surface, as well as with aircraft sensors 16 to position the airport surface relative to the own ship current position. The airport database 20 may either reside as part of the EFB 14 or be separate but accessible to the EFB 14.

The exemplary embodiments of the present invention also add an EFB monitor 44 to the EFB 14 and an internal function or application 28 in the surveillance processor 12 (hereafter "surveillance processor monitor 28"). The surveillance processor monitor 28 may be part of the SAMM application 22 or a separate application, which interfaces the SAMM application 22. Data is passed from the surveillance processor monitor 28 to the EFB monitor 44 over a data bus 46. This data bus 46 may be common with the traffic display data bus, as shown in FIG. 1, or a separate bus. Monitor data is passed from the EFB monitor 44 to the surveillance processor monitor 28 over bus 48. If desired, buses 46 and 48 may be combined as a single bus.

The EFB monitor 44 has interfaces to various applications within the EFB 14, including the operating system 30, the CDTI application 32, the airport database 20, and the other applications 34 and 36, as desired. The EFB monitor 44 may be a separate function from the CDTI application 32, as shown, or it may be integrated into a certified function, such as the CDTI application 32. The EFB monitor 44 and the surveillance processor monitor 28 may be developed to any desired level of software design assurance per the requirements of DO-178B, which is incorporated herein by reference.

Some of the failures and issues surrounding the use of a class 1 EFB or a class 2 EFB for certified applications (such as a type C application), which the present invention provides the ability to mitigate, are:

1) Non-Deterministic Execution—The WINDOWS OS does not assure any FAA level of criticality and is completely interrupt driven. Tasks can lock up peripherals like displays; another task can write over memory used by a task; and the amount of execution time could change based on background tasks and non-critical applications.

2) Potential Corruption of an Executable Program or Data Used by the CDTI application—This could happen accidentally by another task performing an uncontrolled operation or through intentional malicious activities like a virus or hacking.

3) Quality of the Application is Uncontrolled—No FAA level of criticality required for the type A or B applications on the EFB, along with the platform operating system.

Embodiments of the present invention utilized by the EFB monitor 44 and the surveillance processor monitor 28 may employ the following methods to detect if a certified application, such as a type C application (e.g., CDTI application 32), has been interfered with or is not executing properly. For any given embodiment of the present invention, one or more of these methods may be used to provide the desired assurance. In some cases, not all methods may be employed to provide the desired assurance based on agreements with the certification authority, the system architecture, and the functional hazard assessment.

CDTI Failure Indicator

Since the EFB 14 is not certified (because it is a class 2 EFB, though the same would be true of a class 1 EFB), the system 10 cannot rely on the EFB 14 to display a failure indicator if a failure of the CDTI application 32 is detected by the EFB monitor 44. For instance, if the display screen of the EFB 14 is frozen, it cannot be expected that a "FAIL" indicator could be displayed by the EFB 14. Thus, an exemplary embodiment of the present invention provides the pilot with an independent failure indicator for the critical application, which in this instance is a type C application (e.g., CDTI FAIL 38 for CDTI application 32). In FIG. 1, a discrete output lights a lamp in the cockpit which indicates CDTI FAIL 38 when this condition is detected. This visual report could also be accompanied by an aural annunciation in the cockpit, or an aural annunciation could be used in place of a visual indicator. The visual indicator could be output through a discrete signal or over a data bus, and could be displayed as a discrete lamp or as part of an integrated system such as an engine instrument crew alerting system (EICAS).

EFB Monitor Firewall

In an exemplary embodiment of the present invention, the EFB monitor 44 may send EFB monitor status data to the surveillance processor monitor 28 over data bus 48. The surveillance processor monitor 28 may provide a firewall for the data to ensure the system 10 will not be affected by unexpected data. Any conventional firewall may be employed. The surveillance processor monitor 28 may also provide a check of data validity, and protect the system 10 against overloading due to excessive data transmission.

EFB Monitor Validity

In an exemplary embodiment of the present invention, the surveillance processor monitor 28 may be employed to determine whether the code for the EFB monitor 44 is valid or not. For example, the surveillance processor monitor 28 may check the integrity of the code for the EFB monitor 44 upon system initialization, which can occur when power is applied to the surveillance processor 12 or the EFB 14 or at any other desired time (as determined by the surveillance processor 12 or otherwise), or when a reset occurs within the surveillance processor 12 or the EFB 14.

This validity monitoring function can also be performed on a periodic basis at any desired time. For example, the surveillance processor monitor 28 may send over the data bus 46 a signal to the EFB monitor 44 that includes a pseudo-random or a unique time-variant data field value. The EFB monitor 44 can use this to compute a cyclic redundancy check (CRC) of the executable code for the EFB monitor 44, which may include the pseudo-random or unique time-variant data field value in some manner, and return the result to the surveillance processor monitor 28 over bus 48. If the surveillance processor monitor 28 detects an incorrect CRC, a fault in the EFB monitor 44 may therefore be detected and then reported through one of the fault reporting methods described under the above heading "CDTI FAILURE INDICATOR" or otherwise. Moreover, other appropriately-named failure indicators could be employed to supplement the CDTI FAIL 38 indicator, if desired.

Another method for ensuring the code for the EFB monitor 44 is valid and not corrupted is to send a copy of this executable image from the surveillance processor 12 to the EFB 14 over the bus 46 at system initialization time. The EFB 14 can load the received executable image. This method can also use the pseudo-random or unique time-variant data field value described above to ensure the correct application has been loaded and is executing on the EFB monitor 44.

Certified Application Validity

In an exemplary embodiment of the present invention, the EFB monitor 44 may verify that the certified application, such as the CDTI application 32, does not have a corrupted executable and/or that databases used by the application are not corrupted. For example, the EFB monitor 44 may compute the CRC of the executable image of the certified application and/or of the data bases used by the certified application against an expected CRC value. The expected CRC value may be embedded in the certified application or data base, or a separately loaded file in the EFB 14. The EFB monitor 44 can return the computed CRC along with the expected CRC to the surveillance processor monitor 28, which may verify whether the reported values match. If the surveillance processor monitor 28 detects an incorrect CRC, a fault in the certified application may therefore be detected and then reported through one of the fault reporting methods described under the above heading "CDTI FAILURE INDICATOR" or otherwise. Moreover, other appropriately-named failure indicators could be employed to supplement the CDTI FAIL 38 indicator, if desired.

In some applications, the surveillance processor monitor 28 may control the specific version of the certified application which is hosted in the EFB 14 to ensure that the software configuration within the EFB 14 is valid and compatible with the software version of the surveillance processor monitor 28. In this case, the CRC and/or part number of the certified application can be loaded as a data base in the memory of the surveillance processor 12. The surveillance processor monitor 28 may check the computed CRC against the value loaded in the memory of the surveillance processor 12 and declare a failure if the values do not match.

Certified Application Execution Status

In an exemplary embodiment of the present invention, the EFB monitor 44 may be employed to determine whether a certified application, such as the CDTI application 32, is executing in a timely manner and/or that the I/O data for the certified application is being processed correctly. The EFB monitor 44 may also monitor the system operation of the certified application to determine if any abnormal conditions have occurred.

For example, the surveillance processor monitor 28 may periodically send a status request to the EFB monitor 44 at a nominal rate (e.g., one second rate) over the data bus 46. The status request may also contain a pseudo-random or a unique time-variant data field value that varies with time for each status request transmission. After receiving the status request, the EFB monitor 44 may return the status of the EFB 14 and/or the certified application to the surveillance processor monitor 28 over the data bus 48. If a pseudo-random or a unique time-variant data field value is sent to the EFB monitor 44, this value or the result of some computation of that value can be returned to the surveillance processor monitor 28 to ensure that the status result message is for the current status request message. If the surveillance processor monitor 28 does not receive the status result over the data bus 48 in a timely manner, or if there is an error in the status, the surveillance processor monitor 28 may report a fault through one of the previously described fault reporting methods.

In another exemplary embodiment, the EFB monitor 44 may periodically send unsolicited status reports to the surveillance processor monitor 28 at a predefined rate with a pseudo-random or a unique time-variant data field value, such as a system clock or other time-variant information. The surveillance processor monitor 28 can check that the data is sent at the correct rate with the correct system time.

The EFB monitor 44 may also check a number of conditions relative to the execution of the certified application, such as the CDTI application 32, and return the result to the surveillance processor monitor 28 upon request or at a predefined periodic rate. For example, any or all of the following conditions may be checked by the EFB monitor 44. Other conditions relating to the system 10, including the certified application, which are not listed below may also be checked by the EFB monitor 44:

1. The EFB monitor 44 may check that the certified application starts and ends its execution at the required time frames and rates. A failure to execute at the correct rate or a failure to stop execution will be flagged as a fault.

2. The EFB monitor 44 may check that I/O data is processed through the certified application in a timely manner. The certified may provide an indication to the EFB monitor 44 that data is being processed in a timely manner. This may include input data freshness and freshness of data output to the EFB display (not shown) or other devices.

3. The EFB monitor 44 may check that accesses to operating system drivers or resources do not return abnormal or error conditions. The certified application may make this information available to the EFB monitor 44 during calls to the operating system or system resources.

4. The EFB monitor 44 may provide real-time checks of the operating system processes to ensure non-certified processes that may be executing are permissible. The certified application may have been qualified on the EFB 14 with certain applications that are allowed to be executing concurrently. Other applications or viruses may have been loaded that are not qualified for operation and could adversely affect the performance of the certified application. The EFB monitor 44 may dynamically query the operating system application execution status and other items, such as available memory and available processing time, and provide a failure indication to the surveillance processor monitor 28 if an adverse condition exists. The list of allowable processes and other parameters may be a data file loaded on the EFB 14 or the surveillance processor 12.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An electronic flight bag (EFB), comprising:
a processor for performing operations for the EFB;
memory storing an operating system and one or more applications, the one or more applications including at least one application requiring certification by a certifying authority for use on the EFB and at least one application not requiring certification by the certifying authority for use on the EFB; and
an EFB monitoring application configured to determine, cooperatively with a provided processor external to and not part of the EFB, if the at least one application requiring certification is being interfered with or not executing properly.

2. The EFB of claim 1 wherein the EFB comprises one of a class 1 EFB and a class 2 EFB.

3. The EFB of claim 1 wherein the at least one application requiring certification by the certifying authority for use on the EFB comprises a type C application.

4. The EFB of claim 3 wherein the type C application comprises a cockpit display of traffic information (CDTI) application for displaying images on a display.

5. The EFB of claim 1 wherein the at least one application not requiring certification by the certifying authority for use on the EFB comprises one of a type A application and a type B application.

6. The EFB of claim 1 wherein the certifying authority comprises an entity of the Federal Aviation Administration (FAA).

7. The EFB of claim 1 wherein the provided processor external to and not part of the EFB is part of an avionics system.

8. An avionics system, comprising:
a processor for performing operations for the avionics system;
memory storing one or more applications, the one or more applications including at least one of a TCAS application and an application utilizing ADS-B; and
a first application stored in the memory and configured to determine, cooperatively with a second application stored on a provided EFB, whether at least one application stored on the provided EFB and requiring certification by a certifying authority is being interfered with or not executing properly.

9. The avionics system of claim 8 wherein the provided EFB comprises one of a class 1 EFB and a class 2 EFB.

10. The avionics system of claim 8 wherein the at least one application requiring certification by the certifying authority for use on the provided EFB comprises a type C application.

11. The avionics system of claim 10 wherein the type C application comprises a cockpit display of traffic information (CDTI) application for displaying images on a display.

12. The avionics system of claim 8 wherein the certifying authority comprises an entity of the Federal Aviation Administration (FAA).

* * * * *